US 9,761,852 B2

(12) United States Patent
Kim (10) Patent No.: US 9,761,852 B2
(45) Date of Patent: Sep. 12, 2017

(54) BATTERY PACK

(71) Applicant: SAMSUNG SDI CO., LTD., Yongin-si, Gyeonggi-do (KR)

(72) Inventor: Byungryong Kim, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 0 days.

(21) Appl. No.: 15/096,029

(22) Filed: Apr. 11, 2016

(65) Prior Publication Data

US 2016/0308182 A1   Oct. 20, 2016

(30) Foreign Application Priority Data

Apr. 17, 2015   (KR) .................. 10-2015-0054492

(51) Int. Cl.
*H01M 2/12*    (2006.01)
*H01M 10/0525*    (2010.01)
*H01M 2/10*    (2006.01)

(52) U.S. Cl.
CPC ....... *H01M 2/1258* (2013.01); *H01M 2/1077* (2013.01); *H01M 2/1241* (2013.01); *H01M 2/1252* (2013.01); *H01M 2200/00* (2013.01); *H01M 2220/20* (2013.01)

(58) Field of Classification Search
CPC ......... H01M 2200/00; H01M 2220/20; H01M 2/1077; H01M 2/1241; H01M 2/1252; H01M 2/1258; H01M 2/12; H01M 2/1229; H01M 2/1276
See application file for complete search history.

(56) References Cited

U.S. PATENT DOCUMENTS

| 1,587,147 | A | * | 6/1926 | Clark | ............... | H01M 2/12 |
| | | | | | | 429/71 |
| 4,303,745 | A | * | 12/1981 | Anderson | ............... | H01M 2/12 |
| | | | | | | 429/86 |
| 5,523,178 | A | | 6/1996 | Murakami et al. | | |
| 2012/0070703 | A1 | * | 3/2012 | Wahl | ............... | H01M 2/1252 |
| | | | | | | 429/53 |

FOREIGN PATENT DOCUMENTS

| DE | 102014215036 | * | 2/2016 | .............. A62D 3/00 |
| JP | 6-290812 A | | 10/1994 | |
| JP | 2011-124156 A | | 6/2011 | |
| JP | 2011-124202 A | | 6/2011 | |

OTHER PUBLICATIONS

Abstract and Machine English Translation of Japanese Patent Publication No. 2011-124156 A, dated Jun. 23, 2011, 34 pages.
Abstract and Machine English Translation of Japanese Patent Publication No. 2011-124202 A, dated Jun. 23, 2011, 17 pages.

* cited by examiner

*Primary Examiner* — Carlos Barcena
(74) *Attorney, Agent, or Firm* — Lewis Roca Rothgerber Christie LLP (57) ABSTRACT

A battery pack includes a battery cell, a case having a housing space accommodating the battery cell, an exhaust tube connecting the housing space to outside of the case; a treatment agent container connected to the exhaust tube, and a supply controller between the exhaust tube and the treatment agent container.

9 Claims, 5 Drawing Sheets

BATTERY PACK

CROSS-REFERENCE TO RELATED APPLICATION

This application claims priority to and the benefit of Korean Patent Application No. 10-2015-0054492, filed on Apr. 17, 2015, in the Korean Intellectual Property Office, the disclosure of which is incorporated herein in its entirety by reference.

BACKGROUND

1. Field

One or more exemplary embodiments relate to a battery pack.

2. Description of the Related Art

Unlike primary batteries, secondary batteries are designed to be rechargeable. Secondary batteries are used as energy sources of mobile devices, electric vehicles, hybrid electric vehicles, electric bicycles, uninterruptible power supplies, etc. Single-cell secondary batteries or multi-cell secondary battery modules (or secondary battery packs) including a plurality of battery cells connected to one another are used according to the types of devices that employ secondary batteries.

Small mobile devices such as cellular phones may be operated for a predetermined time using single-cell secondary batteries. However, multi-cell battery modules having high-output, high-capacity features may be suitable for devices that have long operating times and that consume large amounts of power such as electric vehicles and hybrid electric vehicles. The output voltages or currents of multi-cell battery modules may be increased by adjusting the number of battery cells included in the multi-cell battery modules.

SUMMARY

One or more exemplary embodiments include a battery pack. If an internal pressure of one or more battery cells in the battery pack becomes greater than a critical value, the battery pack may discharge an exhaust gas. The battery pack detects the discharge of the exhaust gas and supplies a treatment agent so as to remove (or reduce) or detoxify harmful substances included in the exhaust gas so that unspecified individuals around a device using the battery pack as a power source may not be exposed (e.g., unconsciously exposed) to the harmful substances.

Additional aspects will be set forth in part in the description which follows and, in part, will be apparent from the description, or may be learned by practice of the presented embodiments.

According to one or more exemplary embodiments of the present invention, a battery pack includes: a battery cell; a case having a housing space accommodating the battery cell; an exhaust tube connecting the housing space to outside of the case; a treatment agent container connected to the exhaust tube; and a supply controller between the exhaust tube and the treatment agent container.

The treatment agent container may contain water or an alkalic substance mixed with water.

The supply controller may be configured to close or open according to a flow of an exhaust gas in the exhaust tube.

The supply controller may be configured to open by detecting a pressure and/or velocity of flow of an exhaust gas in the exhaust tube.

The supply controller may be configured to open or close according to a difference between an opening pressure and a closing pressure.

The supply controller may include: a barrier wall having an opening connected to the exhaust tube; a closing block configured to contact the barrier wall and to cover the opening of the barrier wall; and an elastic member configured to elastically bias the closing block toward the opening.

The supply controller may include a valve configured to open or close according to an electric signal.

The battery cell may include a safety vent configured to break when an internal pressure of the battery cell exceeds a critical value, and the exhaust tube and the safety vent may be in communication with each other via the housing space.

The battery pack may include a plurality of battery cells, wherein each of the battery cells may include a safety vent and wherein the safety vents of the battery cells may be in communication with the exhaust tube via the housing space that is formed by inner walls of the case and is a non-divided space.

The exhaust tube may provide an exhaust gas path extending from the case to outside of a vehicle in which the battery pack is installed.

BRIEF DESCRIPTION OF THE DRAWINGS

These and/or other aspects will become apparent and more readily appreciated from the following description of the exemplary embodiments, taken in conjunction with the accompanying drawings in which.

DETAILED DESCRIPTION

Reference is made in detail to exemplary embodiments of the present invention, examples of which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

It will be understood that although the terms "first," "second," etc. may be used herein to describe various components, these components should not be limited by these terms. These terms are used to distinguish one component from another. As used herein, the singular forms "a," and "an" are intended to include the plural forms as well, unless the context clearly indicates otherwise. It will be further understood that the terms "comprises," "comprising," "includes," and/or "including" used herein specify the presence of stated features or components, but do not preclude the presence or addition of one or more other features or components. The use of "may" when describing embodiments of the present invention refers to "one or more embodiments of the present invention." As used herein, the terms "use," "using," and "used" may be considered synonymous with the terms "utilize," "utilizing," and "utilized," respectively. Also, the term "exemplary" is intended to refer to an example or illustration.

Sizes of elements in the drawings may be exaggerated for convenience of explanation. In other words, because sizes and thicknesses of components in the drawings are arbitrarily illustrated for convenience of explanation, the following embodiments are not limited thereto.

It will be understood that when an element or layer is referred to as being "on," "coupled to" or "connected to" another element or layer, it can be directly on or directly coupled to or directly connect to the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present.

The electronic or electric devices and/or any other relevant devices or components (e.g., controller 20) according to embodiments of the present invention described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the exemplary embodiments of the present invention.

A battery pack is described in detail below with reference to the accompanying drawings, in which exemplary embodiments are shown.

Figure 1:
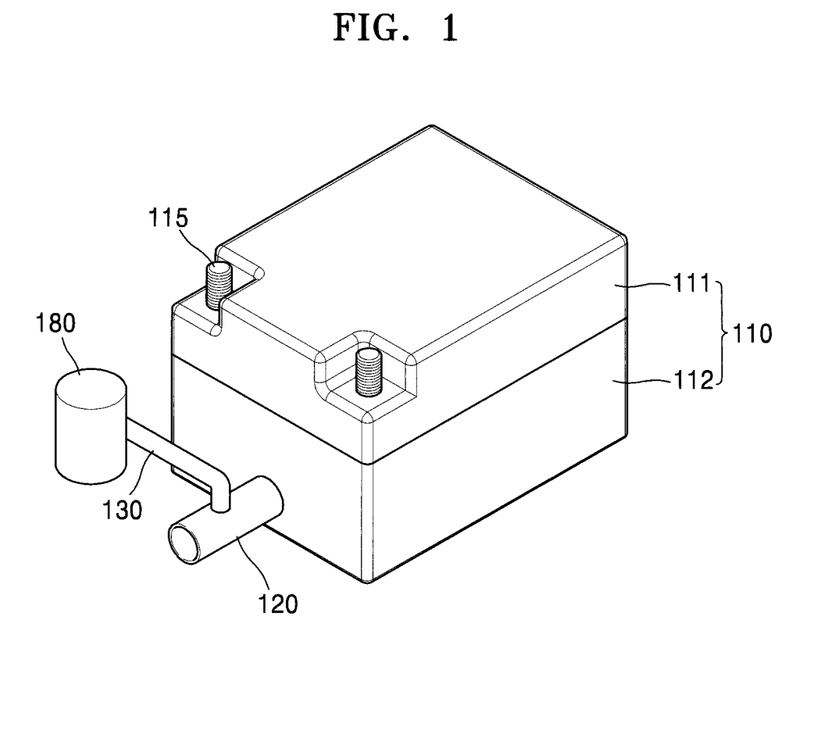
FIG. 1 is a perspective view of a battery pack according to one or more exemplary embodiments of the present invention.
Figure 2:
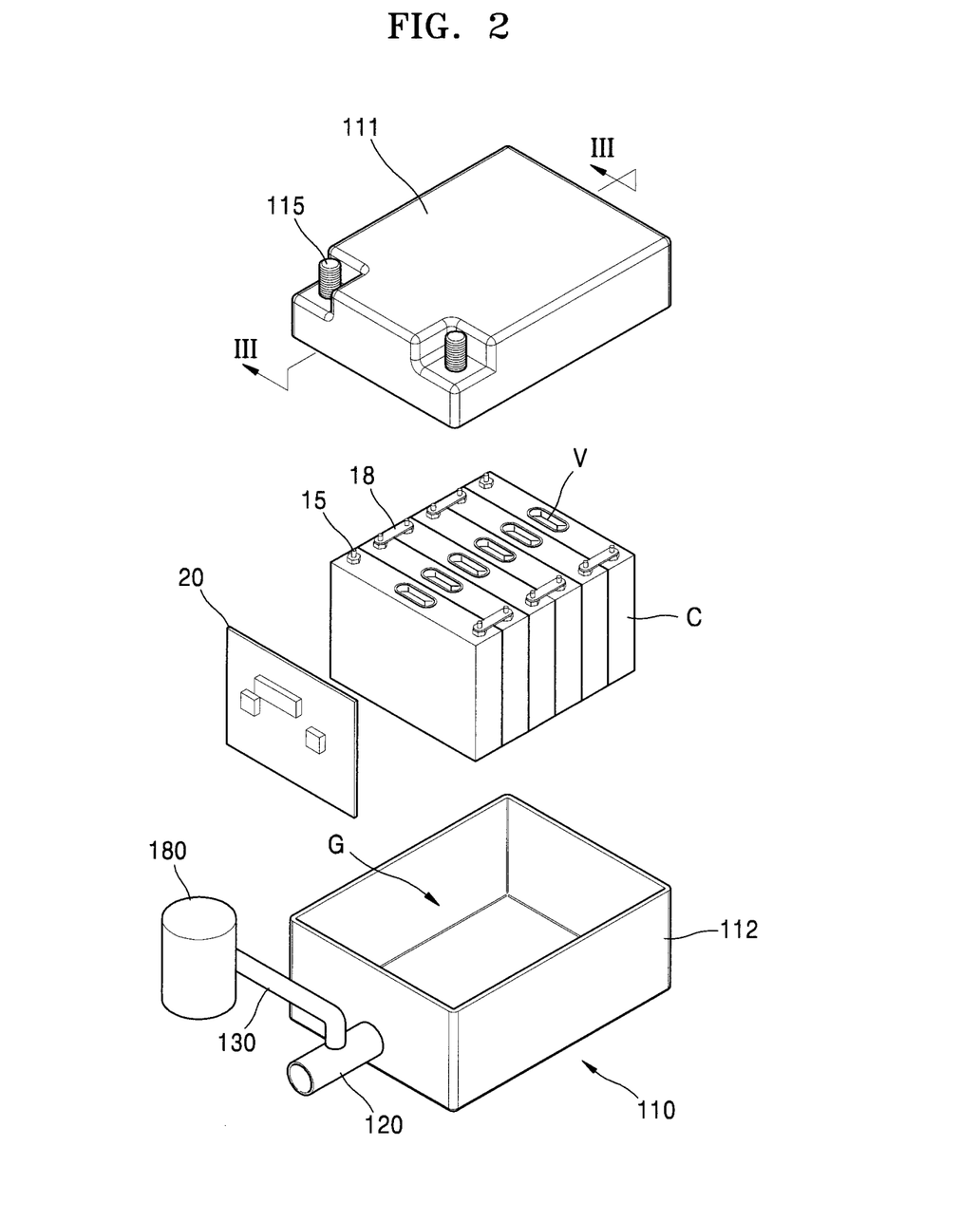
FIG. 2 is an exploded perspective view of the battery pack of FIG. 1.
Figure 3:
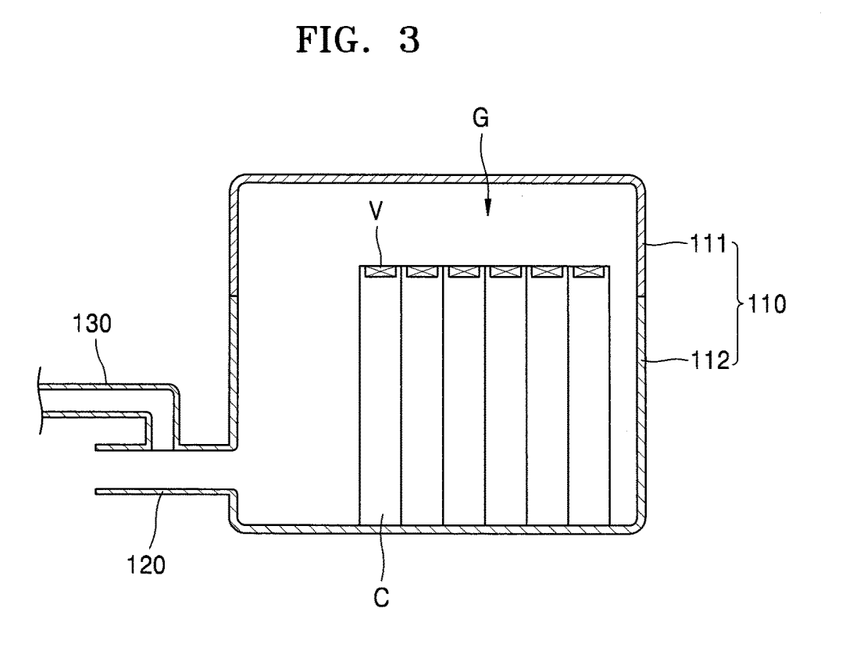
FIG. 3 is a cross-sectional view taken along the line III-III of FIG. 2.

FIG. 1 is a perspective view of a battery pack according to one or more exemplary embodiments. FIG. 2 is an exploded perspective view of the battery pack of FIG. 1. FIG. 3 is a cross-sectional view taken along the line III-III of FIG. 2.

Referring to FIGS. 1 to 3, in one or more exemplary embodiments of the present invention, the battery pack may include at least two battery cells C, a case 110 that provides a housing space G (or an accommodation space) in which the battery cells C are placed, and an exhaust tube 120 connecting the housing space G to the outside of the case 110.

For example, the battery cells C may include lithium-ion battery cells. Each of the battery cells C may include an electrode assembly, and the electrode assembly may include first and second electrode plates having different polarities and a separator disposed between the first and second electrode plates. A plurality of first electrode plates, a plurality of second electrode plates, and a plurality of separators may be included in the electrode assembly to increase the output power and capacity of the battery cell C.

Each of the battery cells C may include electrode terminals 15 that are electrically connected to the electrode assembly and exposed to the outside. The electrode terminals 15 of each of the battery cells C may be respectively electrically connected with the first and second electrode plates, and thus may have different polarities.

The battery pack may include two or more battery cells C, and the battery cells C may be electrically connected to each other by connecting neighboring pairs of the electrode terminals 15 using bus bars 18. For example, the battery cells C may be connected in series, parallel, or series-parallel. The electrode terminals 15 of the battery cells C that are electrically connected to each other may also be connected to external terminals 115 protruding outside the case 110, wherein the electrode terminals 15 form both ends of an electric path. The external terminals 115 may be connected to an external device such as an electric load or a battery charger and may form a charging/discharging current path.

Each of the battery cells C may include a safety vent V that is configured to break or rupture if an internal pressure of gas in the respective battery cell C becomes greater than a preset critical value (e.g., exceeds a predetermined critical value). If the safety vent V is broken, a gas may leak into the housing space G and may be discharged to the outside of the battery pack through the exhaust tube 120 connected to (or in communication with) the housing space G.

In one or more exemplary embodiments, the battery pack may further include a control unit (or controller) 20 for controlling charging and discharging operations of the battery cells C. The control unit 20 may be disposed in the housing space G together with the battery cells C.

For example, the control unit 20 may monitor status information such as voltages, temperatures, and currents of the battery cells C and may control charging and discharging operations of the battery cells C based on the monitored status information. In addition, the control unit 20 may prevent or substantially prevent accidents such as explosion or ignition of the battery cells C in abnormal situations, for example, following overcharge or over-discharge of the battery cells C. As such, the control unit 20 may include sensors such as thermistors and/or Hall sensors so as to measure the temperatures, voltages, and currents of the battery cells C.

The case 110 may provide the housing space G to accommodate (or house or contain) the battery cells C and the control unit 20 for controlling charging and discharging operations of the battery cells C. For example, the housing space G may be defined by inner walls of the case 110. The case 110 may include first and second cases 111 and 112 that are coupled to each other such that the first and second cases 111 and 112 face each other (e.g in mutually facing directions) with the battery cells C being interposed therebetween.

The exhaust tube 120 may have an end (e.g., a first end) connected to the case 110 and an opposite end (e.g., a second end) protruding outside of the case 110 and away from the case 110. For example, the exhaust tube 120 may form an exhaust path through which a gas is discharged from the housing space G to the outside of the battery pack. As such, the exhaust tube 120 may be a hollow pipe protruding outwardly from the case 110.

The exhaust tube 120 is effectively connected to the safety vents V of the battery cells C via the housing space G. For example, the safety vents V of the battery cells C accommodated in the housing space G of the case 110 may be connected to (or in communication with) the exhaust tube 120 through the housing space G. Therefore, if any one of the safety vents V is broken, exhaust gas may enter the housing space G and may be discharged to the outside of the case 110 through the exhaust tube 120 in communication with the housing space G. In one or more embodiments of the present invention, the housing space G may be a non-divided space (e.g., a single space) defined by the inner walls of the case 110. That is, each safety vent V of the battery cells C may be connected to the exhaust tube 120 through the housing space G which is non-divided (e.g., is not separated into multiple sections).

In one or more exemplary embodiments, because the safety vents V are connected to the exhaust tube 120 through the housing space G of the case 110, additional exhaust ducts are not necessary for connecting the safety vents V to the exhaust tube 120. Therefore, the number of components of the battery pack may be reduced, and when the battery pack is manufactured, processes and/or process times may be reduced because it is not necessary to install exhaust ducts. In addition, an exhaust gas may be temporarily stored in the housing space G that has a relatively large size and is formed between the safety vents V and the exhaust tube 120, and thus the likelihood of an excessively large amount of exhaust gas being momentarily discharged to the outside of the battery pack may be reduced or minimized. For example, the battery pack may be installed in a vehicle for providing main or auxiliary power. As such, if an excessively large amount of exhaust gas is momentarily discharged from the battery pack through the exhaust tube 120, the inside of the vehicle (in which a driver or passengers may be located) or the outside of the vehicle (around which unspecified individuals such as pedestrians or mechanics may be located) may be affected (e.g., intensively affected) by harmful substances contained in the exhaust gas. Thus, for example, the housing space G may function as a buffer between the exhaust tube 120 and the safety vents V.

In one or more exemplary embodiments of the present invention, the battery pack may further include a treatment agent container 180. A treatment agent is contained in the treatment agent container 180 for removing or detoxifying harmful substances (e.g., at least some harmful substances) included in the exhaust gas that is discharged from the housing space G. For example, the treatment agent may include water and/or an alkalic substance. For example, the treatment agent may be water or an alkalic substance mixed with water.

The treatment agent may be used to dilute or neutralize the exhaust gas that is discharged from the housing space G so as to remove (or reduce) or detoxify the harmful substances included in the exhaust gas.

Electrochemical reactions occur in the battery cells C accommodated in the housing space G, and harmful substances including phosphorus and/or hydrogen fluoride may be produced due to such electrochemical reactions. If any one of the safety vents V of the battery cells C is broken due to an abnormal state of the respective battery cell C, the harmful substances may leak to the housing space G. The harmful substances may be diluted or neutralized with the treatment agent supplied from the treatment agent container 180 for reducing the degree of harmfulness of the harmful substances, and then the diluted or neutralized harmful substances may be discharged through the exhaust tube 120.

If the treatment agent is water, the harmful substances may be diluted with water, and diffusion of the harmful substances may be prevented or reduced. For example, harmful substances such as hydrogen fluoride may be converted into hydrofluoric acid when dissolved in water, and thus, the generation of harmful vapor may be reduced or suppressed. That is, if the harmful substances are dissolved in water, the vapor pressures of the harmful substances are decreased, and the boiling points of the harmful substances are increased. Therefore, diffusion of the harmful substances may be reduced or suppressed.

If the treatment agent is an alkalic substance mixed with water, a neutralization reaction may occur between the treatment agent and the harmful substance (e.g., hydrogen fluoride), and thus it may be possible to remove the harmful substance (e.g., the hydrogen fluoride). Examples of the alkalic substance include pulverized limestone, sodium hydrogen carbonate, soda, and/or ash. For example, the alkalic substance may be supplied together with water to the exhaust tube 120 in which the exhaust gas flows.

Figure 4:
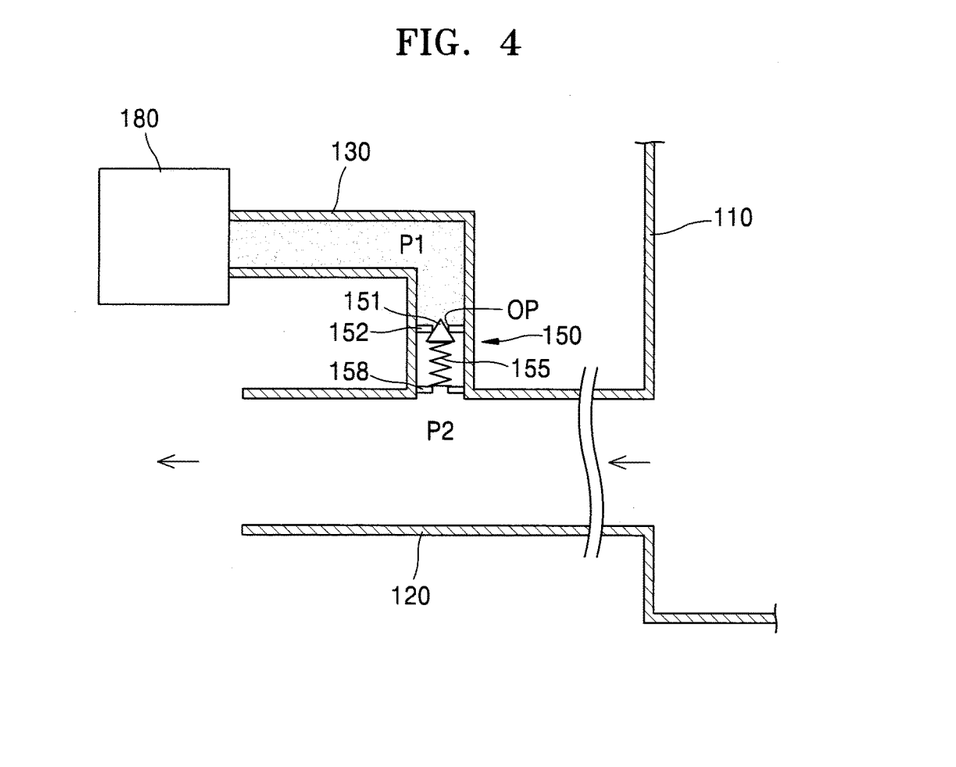
FIG. 4 is a detailed view of a supply controller for supplying a treatment agent.
Figure 5A:
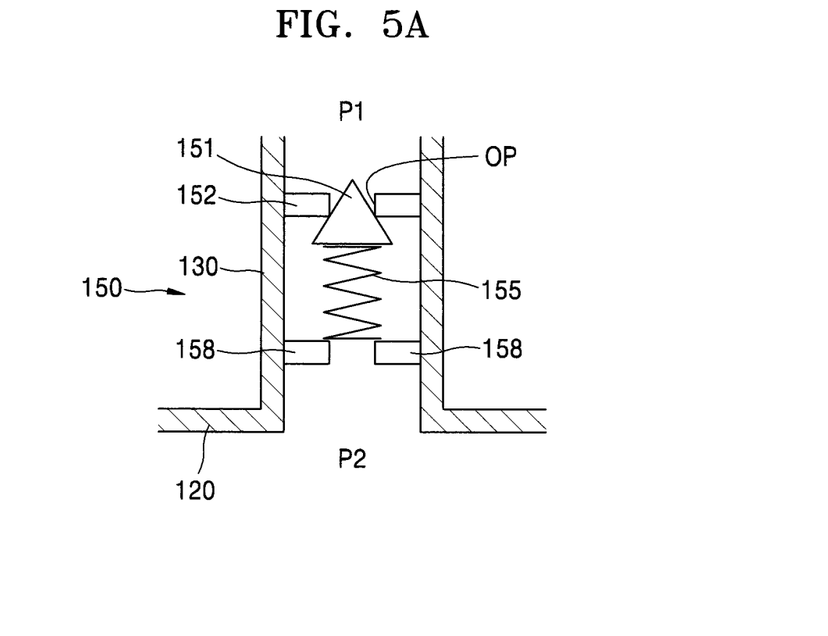
FIG. 5A is a detailed view of the supply controller in a closed state.

FIG. 4 is a detailed view of an opening/closing unit (or supply controller) 150 used for supplying the treatment agent. FIG. 5A is a detailed view of the opening/closing unit 150 in an open state and FIG. 5B is a detailed view of the opening/closing unit 150 in a closed state.

Figure 5B:
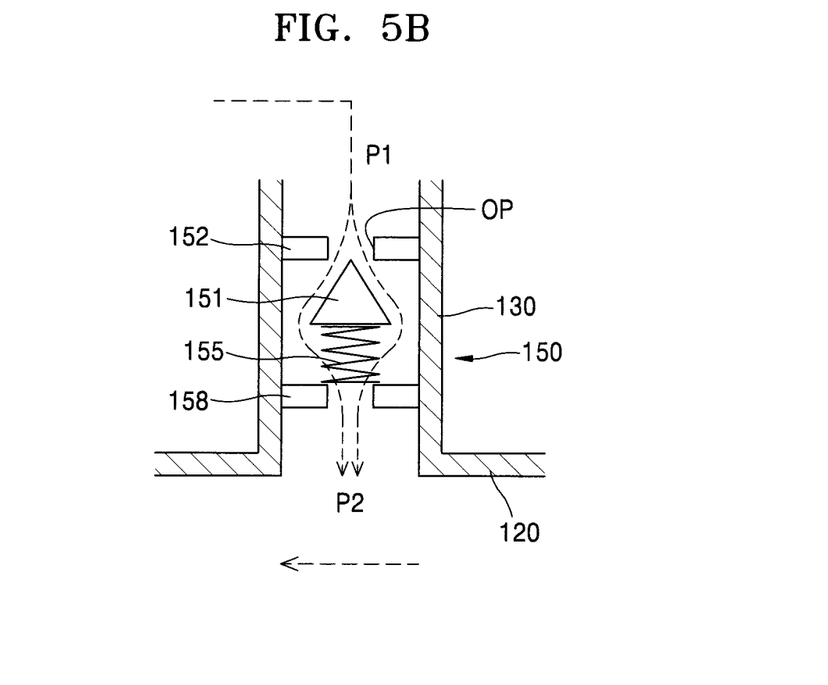
FIG. 5B is a detailed view of the supply controller in an opened state.

Referring to FIGS. 4 to 5B, in one or more exemplary embodiments of the present invention, the opening/closing unit 150 may be disposed between the exhaust tube 120 and the treatment agent container 180. In detail, the opening/closing unit 150 may be disposed in a connection tube 130 connecting the treatment agent container 180 and the exhaust tube 120. The connection tube 130 may form a treatment agent path from the treatment agent container 180 to the exhaust tube 120.

The opening/closing unit 150 may selectively close and open the treatment agent path between the treatment agent container 180 and the exhaust tube 120. For example, when the battery cells C operate normally, no gas flows in the exhaust tube 120. However, if one or more of the battery cells C operate abnormally, the safety vents V of one or more of the battery cells C may break, and an exhaust gas may flow from the housing space G to the outside of the battery pack through the exhaust tube 120. As such, the opening/closing unit 150 may be opened by the flow of the exhaust gas, and thus the treatment agent may be supplied from the treatment agent container 180 to the exhaust tube 120. Then, the exhaust gas flowing in the exhaust tube 120 may react with the treatment agent, and thus harmful substances of the exhaust gas may be removed (or reduced) or detoxified.

The opening/closing unit 150 may be opened or closed by the difference (e.g., by a pressure differential) between an opening pressure P1 and a closing pressure P2. The opening pressure P1 and the closing pressure P2 refer to pressures acting on opposite sides of the opening/closing unit 150 in mutually-facing directions. The opening/closing unit 150 is opened or closed according to the difference between the opening pressure P1 and the closing pressure P2.

In detail, the opening pressure P1 acts on the opening/closing unit 150 in an opening direction of the opening/closing unit 150. The closing pressure P2 acts on the opening/closing unit 150 in a closing direction of the opening/closing unit 150. For example, the opening pressure P1 may be the pressure of the treatment agent container 180. The closing pressure P2 may be the internal pressure of the exhaust tube 120.

The opening/closing unit 150 may include an elastic member 155 elastically biasing the opening/closing unit 150 in the closing direction. The closing pressure P2 may be the sum of the internal pressure of the opening/closing unit 150 and an elastic pressure applied by the elastic member 155.

For example, according to the principle of the conservation of energy as applied to the relationship between the pressure and velocity of the exhaust gas, if the velocity of the exhaust gas discharged from the housing space G and flowing in the exhaust tube 120 increases, the internal pressure of the exhaust tube 120 decreases. Thus, the opening pressure P1 and the closing pressure P2 acting on both sides of the opening/closing unit 150 are unbalanced because the closing pressure P2 decreases. That is, the opening pressure P1 becomes greater than the closing pressure P2. Then, the opening/closing unit 150 is opened, and the treatment agent is supplied from the treatment agent container 180 to the exhaust tube 120 in which the treatment agent reacts with the exhaust gas.

The opening/closing unit (or supply controller) 150 is described in more detail below. The opening/closing unit 150 may include a barrier wall 152 having an opening OP connected to (or in communication with) the exhaust tube 120, a closing block 151 that contacts the barrier wall 152 and is configured to cover the opening OP, and the elastic member 155 that is configured to elastically bias the closing block 151 toward the barrier wall 152 so as to close the opening OP.

The opening OP in the barrier wall 152 is connected to (or in communication with) the exhaust tube 120. That is, the opening OP connects the exhaust tube 120 and the treatment agent container 180. When the opening OP is open (or exposed), the treatment agent is supplied from the treatment agent container 180 to the exhaust tube 120. The closing block 151 covers the opening OP. That is, at a closing position (e.g., when moving from the opened state to the closed state), the closing block 151 may be brought into contact with the barrier wall 152 so as to cover the opening OP. If the closing block 151 is moved away from the barrier wall 152, the opening OP is opened.

The elastic member 155 elastically biases the closing block 151 toward the opening OP. For example, the elastic member 155 may include an end (e.g., a first end) coupled to a side of the connection tube 130 and another end (e.g., a second end opposite to the first end) coupled to the closing block 151. In detail, the first end of the elastic member 155 may be fixed to a side of the connection tube 130, and the second end of the elastic member 155 may be coupled to the closing block 151 and may be moved together with the closing block 151. For example, the first end of the elastic member 155 may be supported by a fixing part 158 formed on an inner circumferential surface of the connection tube 130. The elastic member 155 may be installed in such a manner that the elastic member 155 may elastically bias the closing block 151 in a closing direction.

According to the difference between the opening pressure P1 and the closing pressure P2 acting on the opposite sides (e.g., the first and second sides) of the closing block 151 in mutually facing directions, the closing block 151 may be placed or positioned at the closing position to close the opening OP or may be moved away from the opening OP to open the opening OP. As such, the opening pressure P1 may correspond to the pressure of the treatment agent container 180, and the closing pressure P2 may correspond to the sum of the internal pressure of the exhaust tube 120 and a pressure applied by the elastic member 155.

As described above, if an exhaust gas starts to flow in the exhaust tube 120, the internal pressure of the exhaust tube 120 decreases, and thus the opening pressure P1 may become greater than the closing pressure P2. Then, the closing block 151 may be moved and opened to supply the treatment agent, and the treatment agent may react with the exhaust gas flowing in the exhaust tube 120, thereby removing (or reducing) or detoxifying harmful substances contained in the exhaust gas.

According to one or more exemplary embodiments of the present invention, the opening/closing unit 150 may be opened or closed by a mechanical pressure difference. For example, the opening/closing unit 150 may detect the exhaust gas flowing in the exhaust tube 120 by sensing a pressure or a velocity of flow in the exhaust tube 120. In one or more exemplary embodiments, the opening/closing unit 150 may be opened when the opening pressure P1 and the closing pressure P2 are unbalanced due to a pressure variation in the exhaust tube 120. In other exemplary embodiments, however, the opening/closing unit 150 may be opened in response to a variation in the velocity of flow in the exhaust tube 120. For example, the opening/closing unit 150 may be opened by utilizing a rotor that is configured to rotate according to the flow of gas. In this case, the exhaust tube 120 may have a bottleneck shape so as to create a sufficiently fast flow for inducing opening of the opening/closing unit 150.

Figure 6:
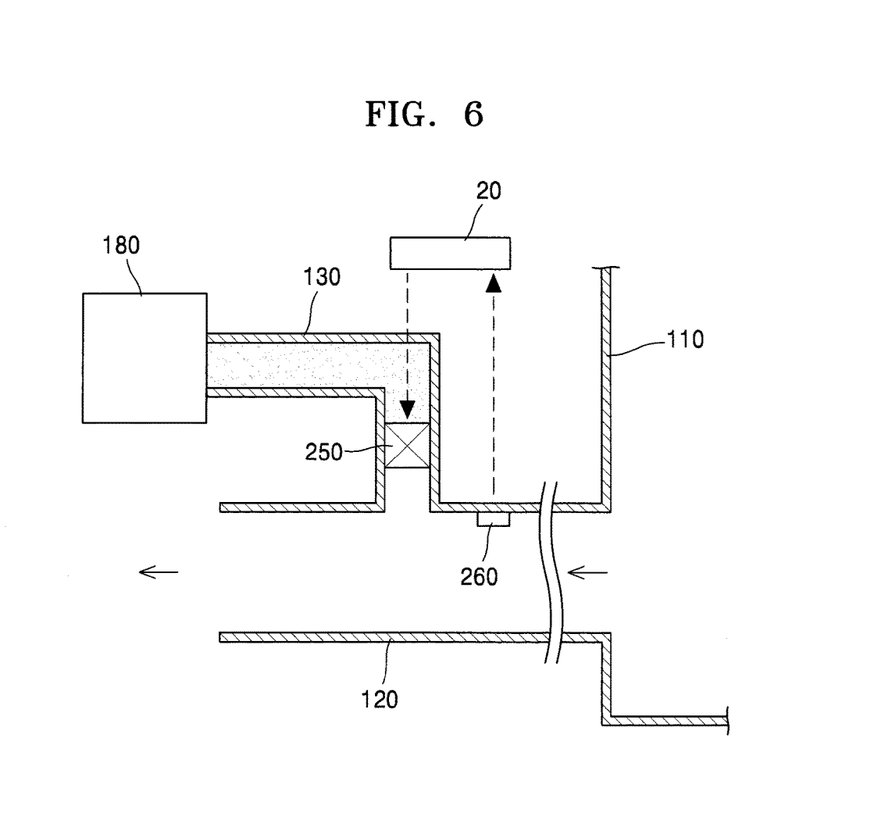
FIG. 6 is a detailed view of a supply controller according to one or more exemplary embodiments of the present invention.

FIG. 6 is a detailed view of an opening/closing unit 250 according to one or more exemplary embodiments of the present invention.

Referring to FIG. 6, the opening/closing unit 250 may include a valve configured to close or open a treatment agent supply path connected to the treatment agent container 180 in response to an electric signal. For example, a sensor 260 disposed inside the exhaust tube 120 may be used to measure the internal pressure of the exhaust tube 120 or the velocity of flow in the exhaust tube 120 and thus to detect a flow of gas in the exhaust tube 120. If a flow of gas is detected, a control unit 20 may transmit an opening signal to the opening/closing unit 250 to open the treatment agent supply path. According to one or more exemplary embodiments, the sensor 260 may be disposed relatively near (or close to) the battery cells C to detect breakage of one or more of the safety vents V of one or more of the battery cells C, and the opening/closing unit 250 may open the treatment agent supply path according to an output signal of the sensor 260.

The control unit 20 may monitor charging and discharging operations of the battery cells C. As such, the control unit 20 may include a plurality of sensors. For example, the control unit 20 may detect a gas discharge start time based on signals output from sensors disposed at the safety vents V of the battery cells C or the sensor 260 disposed in the exhaust tube 120. Then, based on results of the detection, the control unit 20 may transmit an opening signal to the opening/closing unit 250 to supply the treatment agent.

For example, the opening/closing unit 250 may include the valve and may detect a flow of gas in the exhaust tube 120 by directly sensing the internal pressure of the exhaust tube 120 or the velocity of flow in the exhaust tube 120, or by indirectly sensing the internal pressure of the exhaust tube 120 or the velocity of flow in the exhaust tube 120 by using the sensor 260. According to the signals output from the sensors, the opening/closing unit 250 may open the treatment agent path.

In the exemplary embodiments, the exhaust tube 120 may provide an exhaust gas path extending to the outside of the case 110 from the housing space G in which the battery cells C are disposed. In addition, the exhaust tube 120 may further extend from the outside of the case 110 to the outside of a device in which the battery pack is installed. For example, the battery pack may be installed in a device such as a vehicle and may provide main or auxiliary power.

Figure 7:
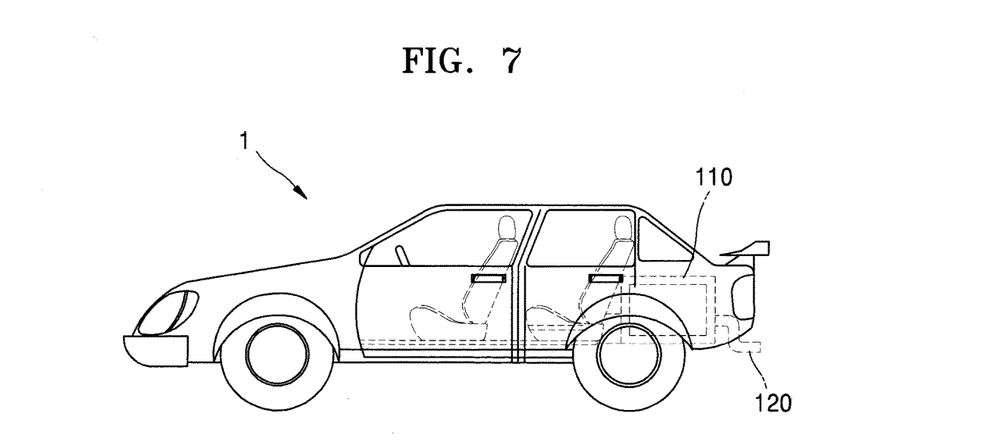
FIG. 7 is a schematic view of a battery pack installed in a vehicle according to one or more exemplary embodiments of the present invention.

FIG. 7 is a schematic view of the battery pack installed in a vehicle 1 according to one or more exemplary embodiments of the present invention.

Referring to FIG. 7, the exhaust tube 120 extending from the case 110 of the battery pack may be exposed to the outside of the vehicle 1. The exhaust tube 120 may have any suitable shape or structure such that the exhaust tube 120 provides an exhaust gas path extending to the outside of the case 110 from the housing space G in which the battery cells C are disposed. For example, the exhaust tube 120 may include an assembly of hollow members having various shapes that are connected to each other. The exhaust tube 120 may be formed of a single hollow member or an assembly of hollow members connected to each other, so as to provide an exhaust gas path connected to the accommodation space G.

In one or more exemplary embodiments, a portion of the exhaust tube 120 having a relatively narrow cross-section may be connected to the treatment agent container 180 so as to improve the sensitivity of the opening/closing unit 150 when determining whether to supply a treatment agent. That is, the difference between pressures acting on the opening/closing unit 150 may be amplified by connecting a relatively narrow portion of the exhaust tube 120 to the treatment agent container 180 because the internal pressure of the exhaust tube 120 is markedly reduced at the relatively narrow portion in proportion to the velocity of flow of the exhaust gas.

According to the exemplary embodiments, when an exhaust gas is discharged from the battery pack, if the internal pressure of the battery cells C becomes greater than a critical value, the discharge of the exhaust gas may be detected, and a treatment agent may be supplied so as to remove (or reduce) or detoxify harmful substances included in the exhaust gas. For example, the battery pack may be used to supply main or auxiliary power to the vehicle 1. As such, even though an exhaust gas is discharged from the battery pack, the exhaust gas may not typically be detected with the naked eye unless the exhaust gas is visible smoke or has other noticeable characteristics. That is, a driver may not recognize such an emergency situation. However, according to the one or more exemplary embodiments of the present invention, without requiring action from a driver of the vehicle 1, the exhaust gas may be automatically detected, and a treatment agent may be supplied to remove or reduce or detoxify harmful substances included in the exhaust gas so that the driver may be protected from the harmful substances. In addition, even though pedestrians or mechanics outside the vehicle 1 may not recognize such an emergency situation, the pedestrians or mechanics may not be exposed to the harmful substances.

The treatment agent is supplied from the treatment agent container 180 which is connected to the exhaust tube 120 that extends outward from the case 110. That is, an inside region of the case 110 is not used for storing or supplying a treatment agent. Thus, because the inside region of the case 110 in which the battery cells C and the control unit 20 are disposed is not used for storing or supplying a treatment agent, the battery pack may have a small size and light weight.

As described above, according to one or more exemplary embodiments of the present invention, when an exhaust gas is discharged from the battery pack if the internal pressure of one or more of the battery cells C becomes greater than a critical value, the battery pack detects the discharge of the exhaust gas and supplies a treatment agent so as to remove (or reduce) or detoxify harmful substances included in the exhaust gas. Therefore, harmful substances may not diffuse around a device such as a vehicle in which the battery pack is disposed as a power source, and thus a driver of the vehicle or unspecified individuals such as pedestrians or mechanics may not be exposed (e.g., unconsciously exposed) to harmful substances.

In addition, because a treatment agent is supplied from the treatment agent container 180 disposed outside the case 110, the inside region of the case 110 in which the battery cells C and the control unit 20 are disposed is not used for storing or supplying a treatment agent, and thus the battery pack may have a relatively small size and a relatively light weight.

It should be understood that exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope as defined by the following claims and their equivalents.

What is claimed is:

1. A battery pack comprising:
    a battery cell;
    a case having a housing space accommodating the battery cell;
    an exhaust tube connecting the housing space to outside of the case;
    a treatment agent container connected to the exhaust tube; and
    a supply controller between the exhaust tube and the treatment agent container, wherein the treatment agent container contains water or an alkalic substance mixed with water.

2. The battery pack of claim 1, wherein the supply controller is configured to close or open according to a flow of an exhaust gas in the exhaust tube.

3. The battery pack of claim 1, wherein the supply controller is configured to open by detecting a pressure and/or velocity of flow of an exhaust gas in the exhaust tube.

4. The battery pack of claim 1, wherein the supply controller is configured to open or close according to a difference between an opening pressure and a closing pressure.

5. The battery pack of claim 1, wherein the supply controller comprises:
   a barrier wall having an opening connected to the exhaust tube;
   a closing block configured to contact the barrier wall and to cover the opening of the barrier wall; and
   an elastic member configured to elastically bias the closing block toward the opening.

6. The battery pack of claim 1, wherein the supply controller comprises a valve configured to open or close according to an electric signal.

7. The battery pack of claim 1, wherein the battery cell comprises a safety vent configured to break when an internal pressure of the battery cell exceeds a critical value, and
   wherein the exhaust tube and the safety vent are in communication with each other via the housing space.

8. The battery pack of claim 1, wherein the battery pack comprises a plurality of battery cells,
   wherein each of the battery cells comprises a safety vent, and
   wherein the safety vents of the battery cells are in communication with the exhaust tube via the housing space that is formed by inner walls of the case and is a non-divided space.

9. The battery pack of claim 1, wherein the exhaust tube provides an exhaust gas path extending from the case to outside of a vehicle in which the battery pack is installed.

\* \* \* \* \*